(12) United States Patent
Poitras

(10) Patent No.: US 7,544,061 B2
(45) Date of Patent: Jun. 9, 2009

(54) APPARATUS FOR TEACHING AND PRACTICING DENTAL PROCEDURES

(76) Inventor: Bernard M. Poitras, 33 Cartier St., Cranston, RI (US) 02920

( * ) Notice: Subject to any disclaimer, the term of this patent is extended or adjusted under 35 U.S.C. 154(b) by 673 days.

(21) Appl. No.: 11/215,909

(22) Filed: Aug. 31, 2005

(65) Prior Publication Data
US 2006/0252020 A1 Nov. 9, 2006

Related U.S. Application Data

(60) Provisional application No. 60/678,286, filed on May 6, 2005.

(51) Int. Cl.
*G09B 23/28* (2006.01)
(52) U.S. Cl. ....................... 434/263
(58) Field of Classification Search .......... 434/263, 434/264; 433/53, 54, 57
See application file for complete search history.

(56) References Cited

U.S. PATENT DOCUMENTS

| | | | |
|---|---|---|---|
| 673,019 A * | 4/1901 | Gilbert ................ 434/263 |
| 1,166,796 A * | 1/1916 | Weisse ................ 434/264 |
| 1,205,437 A * | 11/1916 | Delabarre ............ 434/264 |
| 1,342,156 A * | 6/1920 | Brittain .............. 434/263 |
| 3,520,060 A | 7/1970 | Crabtree et al. | |
| 3,787,979 A * | 1/1974 | Acevedo ............. 434/263 |
| 4,035,920 A | 7/1977 | Saupe | |
| 4,160,323 A | 7/1979 | Tracy | |
| 4,200,996 A * | 5/1980 | Richards ............. 434/264 |
| 4,221,060 A | 9/1980 | Moskowitz et al. | |
| 4,286,949 A | 9/1981 | Holt, Jr. | |
| 4,792,306 A * | 12/1988 | Duplantis ............ 434/264 |
| 4,968,256 A * | 11/1990 | Lang et al. .......... 434/263 |
| 5,102,340 A | 4/1992 | Berlinghoff et al. | |
| 5,108,292 A * | 4/1992 | Kirk et al. ........... 434/263 |
| 5,158,488 A | 10/1992 | Berlinghoff et al. | |
| 5,480,307 A | 1/1996 | Lang et al. | |
| 6,988,894 B2 * | 1/2006 | Lee et al. ............ 434/263 |

\* cited by examiner

*Primary Examiner*—Kurt Fernstrom
(74) *Attorney, Agent, or Firm*—Cserr P & SC

(57) ABSTRACT

A light weight, portable teaching and practicing device for the simulation and practice of dental procedures is provided.

5 Claims, 4 Drawing Sheets

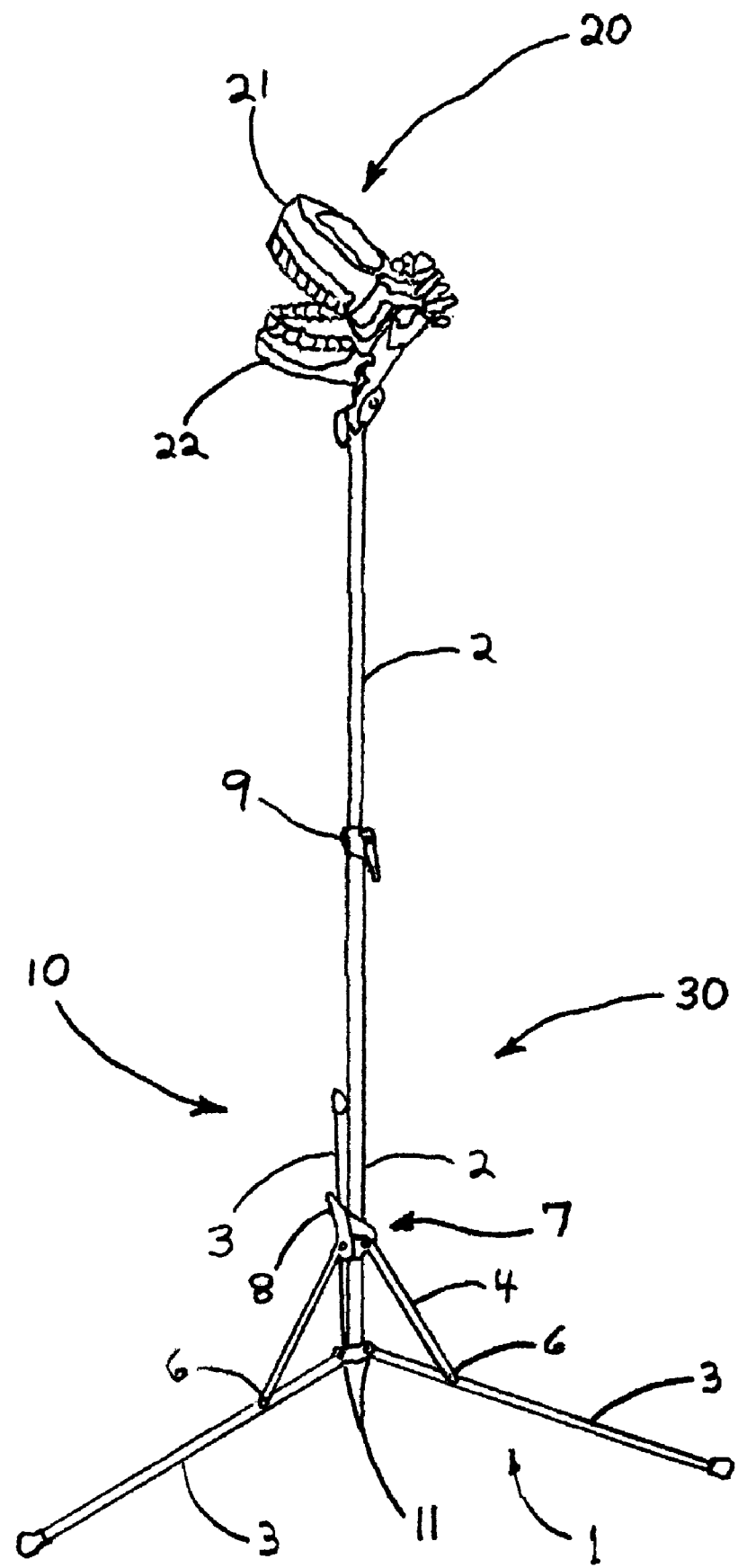

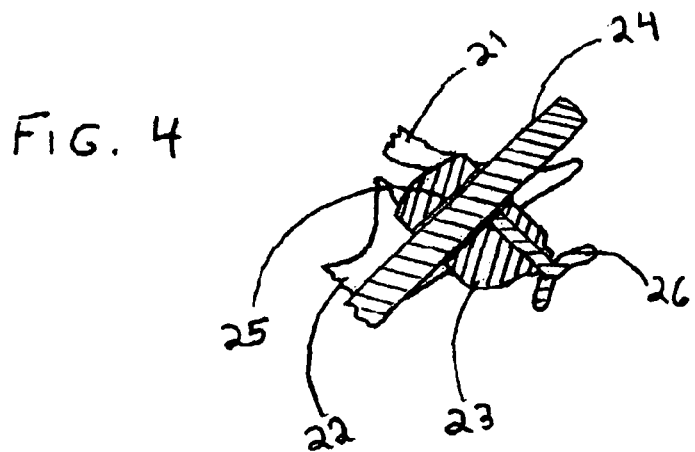
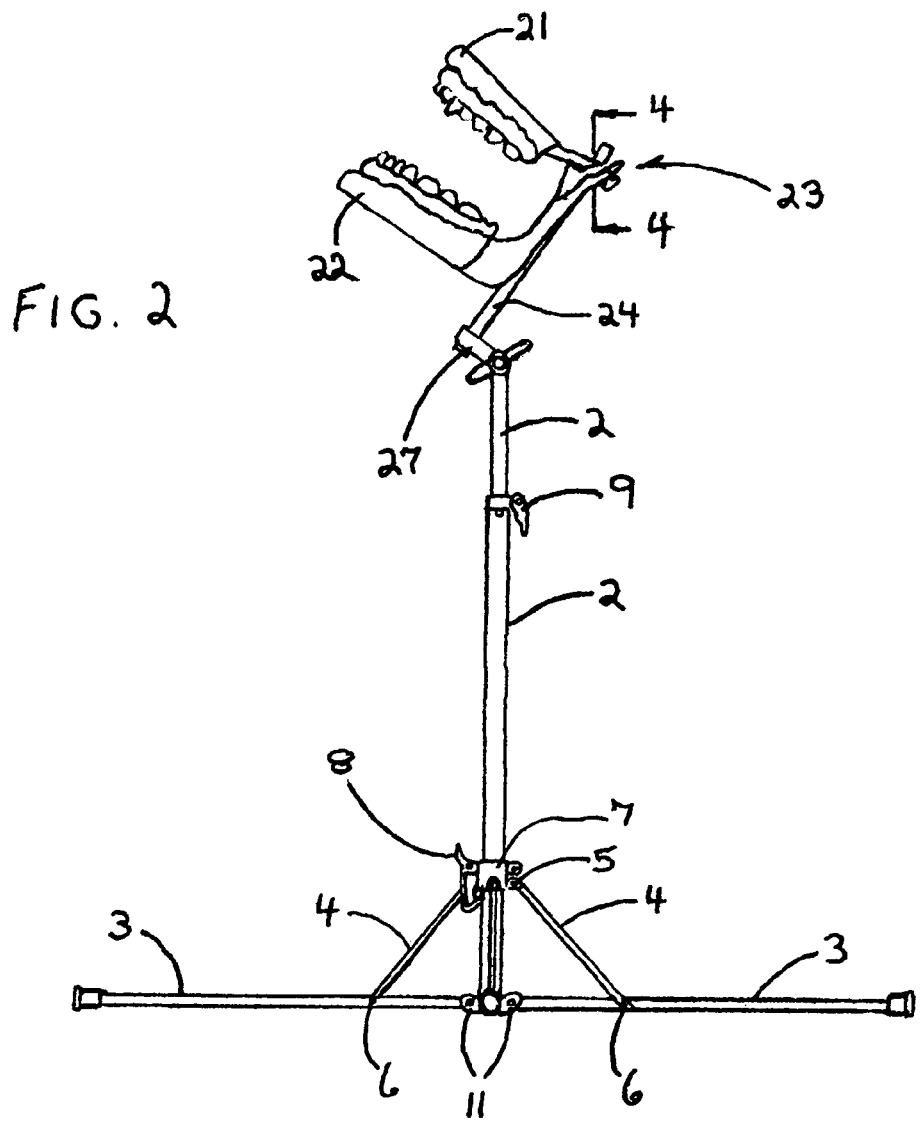

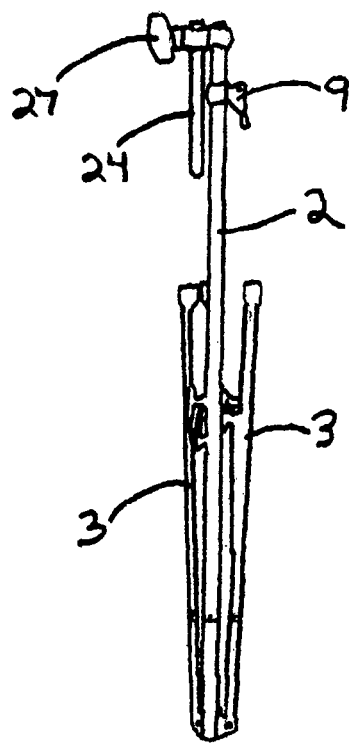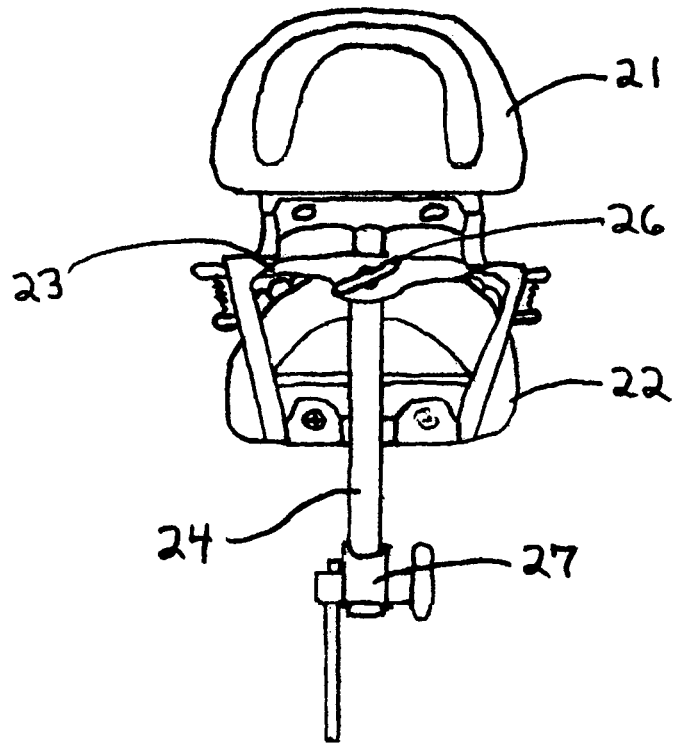

APPARATUS FOR TEACHING AND PRACTICING DENTAL PROCEDURES

PRIORITY

This application claims priority from provisional application 60/678,286, filed May 6, 2005.

FIELD OF THE INVENTION

The invention relates to an apparatus for simulating, teaching and practicing dental procedures.

BACKGROUND OF THE INVENTION

Various dental training apparatuses are known in the art. For example, U.S. Pat. No. 5,158,488 discloses a combined teaching and practicing apparatus for dental work composed of a movable station and an immovable station, with the movable station incorporating a dummy upper torso. U.S. Pat. No. 5,480,307 discloses a training and practice apparatus for clinical dental processes composed, essentially and in broad outline, of a model bust mounted on a carrier. The model bust comprises a chest part, a neck and a swivel-mounted head. The head can be swiveled into different working positions and fixed. U.S. Pat. No. 5,433,613 discloses a training and practice apparatus for clinical dental work composed liquid and solid extraction devices with a common vacuum source. U.S. Pat. No. 5,102,340 discloses a dental teaching and practicing apparatus composed of a phantom head pivotally mounted on the work surface through a pivot am.

In addition, portable dental treatment apparatuses are known in the art. For example, U.S. Pat. No. 4,286,949 discloses a compact portable and essentially unitary structure composed of a stable support base with a compressor motor unit on which other components, like dental drills, syringes and suction devices are mounted. U.S. Pat. No. 4,160,323 discloses another portable structure composed of a wheeled cabinet containing a compressed air source, a vacuum pump, a pressurizable water reservoir and an amalgamator.

All of the foregoing devices are expensive to manufacture, most of unnecessarily large and some are overly intricate and complicated. There is a need in the art for a simple, affordable device that dental students can readily employ in the classroom, clinic or at home to practice the various dental procedures they are learning. The device should be simple to use and allow for simulating the tooth environment to enable students to practice and train on teeth in a low-pressure setting.

SUMMARY OF THE INVENTION

The foregoing objects and needs are met by the training and practice apparatus of the invention. A light weight, portable teaching and practicing device for the simulation and practice of dental procedures comprises a stand, the stand having a base and a height adjustable pole member disposed in substantially perpendicular relation to the base and attached thereto at one end. Preferably the base of the stand is composed of a plurality of legs and the legs are foldable so as to permit them to be folded in an arrangement in parallel with the first pole member. The legs are attached to the first pole member by a locking hinge arrangement that permits the legs to pivot and fold as will be described in detail below.

At the opposite end of the pole member is a dental model of the upper and lower teeth and gums of the patient, the model comprising an upper teeth plate, a lower teeth plate, and a hinge member. The hinge member is formed and disposed in hinge forming relation between the upper teeth plate and the lower teeth plate to enable opening and closing of the plates in relation to each other.

Fastening means for fastening the dental model to the pole member at the end opposite the base are also provided. Any means of fastening the dental model to the pole member may be employed. However, it is preferred that the fastening means be included in the hinge member. In this embodiment, the dental model hinge member is formed with an aperture disposed and arranged to accept an arm. One end of the arm is removable mounted within the aperture by means of a screw pin and the other end of the arm is attached to the pole member by means of a rotating adjustment clamp.

DESCRIPTION OF THE DRAWINGS

FIG. 1 is a plan view of the device of the invention.

FIG. 2 is a plan view of the device of the invention with an enlarged view of the dental model of the upper and lower teeth.

FIG. 4 is an exploded view of a portion of the dental model taken along the line 4-4 in FIG. 2.

FIG. 5 is a plan view of the stand portion of the device.

FIG. 6 is a back view of the dental model portion of the device.

DETAILED DESCRIPTION

Figure 3:
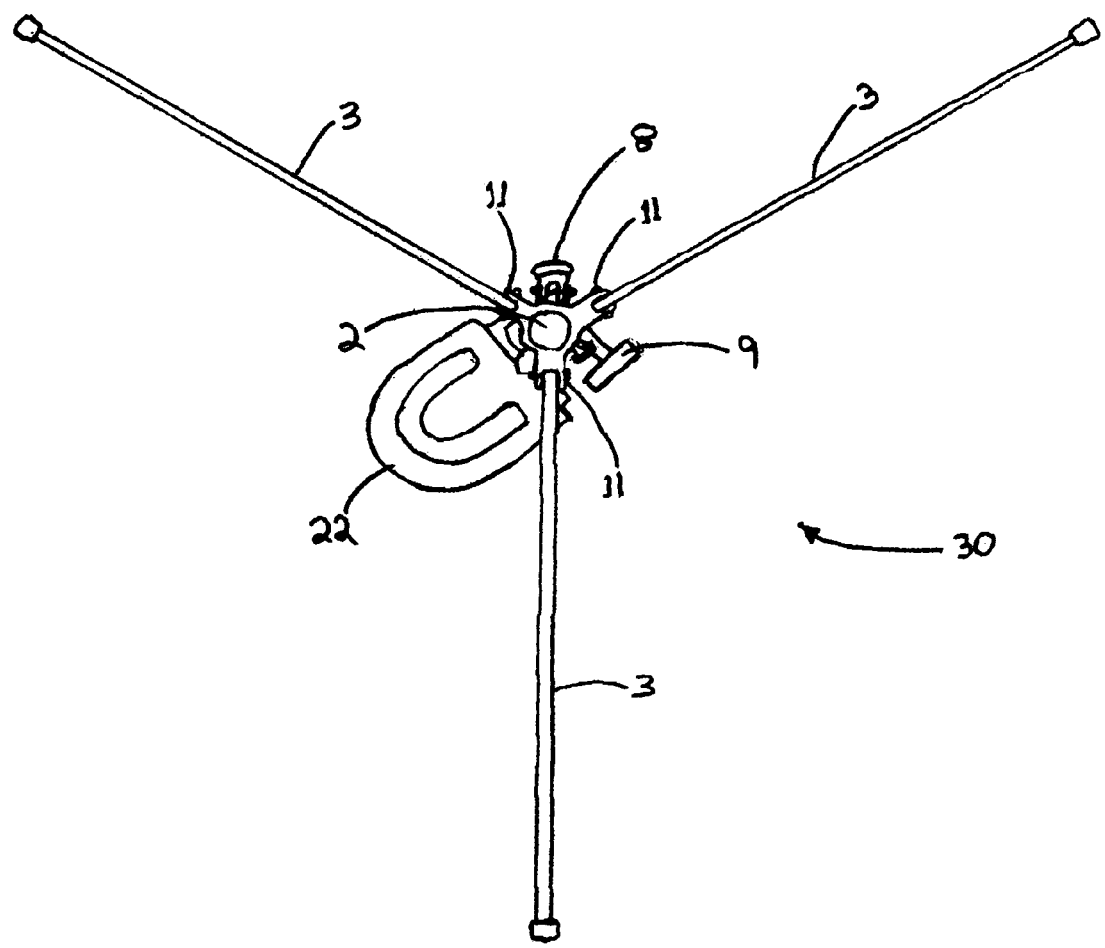
FIG. 3 is a bottom view of the device of the invention.

Referring in particular to FIGS. 1 and 3, a light weight, portable teaching and practicing device 30 for the simulation and practice of dental procedures is illustrated comprising a stand 10, the stand having a base 1 and a height-adjustable pole member 2 disposed in substantially perpendicular relation to base 1. As illustrated, pole member 2 is composed of two telescoping, rigid, cylindrically-shaped metal rods, pipes or tubes although a circular cross-sectional shape is not critical and other cross-sectional shapes (square for example) are contemplated. The critical feature of pole member 2 is that it forms a height adjustable vertical shaft that is able to mount on the base at one end and support the dental model at the opposite end.

Preferably base 1 of the stand is composed of a plurality of legs 3. Legs 3 are foldable so as to permit them to be folded in an arrangement in parallel with pole member 2 as illustrated in FIG. 5. In this embodiment, a lever 4 is disposed and arranged between each of legs 3 and the bottom end of pole member 2. The number of levers provided will be equal to the number of legs forming the base of the device. One end of each of the levers 4 is rotatably connected by first pivot means 5 to the vertical shaft of pole member 2 through surrounding sleeve 7 and the other end of each of levers 4 is rotatably connected by second pivot means 6 to legs 3. First and second pivot means 5 and 6 comprise, for example, the well known lug and rivet arrangement positioned at each of the two ends of levers 4. Also provided is surrounding sleeve 7 disposed and arranged slidably around pole member 2 and forming the point of attachment of the top of levers 4 to pole member 2 through first pivot means 5. Sleeve 7 reciprocates along pole member 2 thereby adjusting the extension and position of legs 3 from an open fully extended position perpendicular to pole member 2 as illustrated in FIG. 2 to a closed position parallel to pole member 2 as illustrated in FIG. 5. Sleeve 7 includes locking means 8 mounted on it to secure the legs in the desired position. First and second pivot means 6, sleeve 7 and locking means 8 are well known components of various foldable devices such as music stands, umbrellas and luggage carriers and their arrangement is well known to those skilled in the art. In the embodiment illustrated locking means 8 is composed of a dog which reciprocates between an open and closed position on sleeve 7. Alternatively, locking means 8 could be a threaded screw that screws into a screw hole in sleeve 7 which when tightened makes contact with the first pole member to lock the legs in the desired position. A pin and hole detent arrangement may also be employed to adjust the position of the legs.

Pole member 2 is composed of two rigid telescoping metal poles, one of which is attached to base 1 and the other of which is formed and positioned to slide from an enclosed position inside the interior of the other pole to an extended position outside of and extending from the other pole. Mounted on the portion of pole member 2 which is attached to base 1 is height adjustment means 9 is composed of a sleeve and screw arrangement positioned in surrounding relation to telescoping pole member 2 to permit the pole member to be extended and collapsed in a telescoping manner as is known in the art. Alternative embodiments of height adjustment means 9 are contemplated and may take the form of the pin and hole detent arrangement as is disclosed for example in U.S. Pat. No. 6,719,257, the ball locking arrangement disclosed for example in U.S. Pat. No. 5,593,239 or the reciprocating dog arrangement described above which are herein incorporated by reference for these aspects of their disclosure.

Removably attached to the extending end of that portion of pole member 2 which slides from an enclosed position to an extended position is dental model 20. Dental model 20 is model of a human patient's upper and lower teeth and gums and comprises an upper teeth plate 21, a lower teeth plate 22, and a hinge member 23. Such models are known in the art and may be obtained from various manufacturers, for example from Kilgore International Inc. (Coldwater, Mich.). The hinge member is formed and disposed in hinge forming relation between the upper teeth plate and the lower teeth plate to enable opening and closing of the plates in relation to each other.

Referring now to FIGS. 2, 4 and 6, fastening means for fastening the dental model to the first pole member at the end opposite the base are also provided in the form of arm 24 and aperture 25 in hinge member 23 formed and arranged to accept arm 24. The arm 24 is secured at one end within aperture 25 by means of adjustment screw 26 which permits the dental model to be removably connected to second pole member. At its opposite end the arm, 24, is attached to pole member 2 by means of rotating adjustment clamp 27 as is illustrated in FIGS. 2 and 5. Clamp 27 when loosened permits rotation of arm 24 radially and when tightened secures arm 24 in the desired position for working with the device.

To use the device of the invention, the dental student unlocks locking means 8 and extends sleeve 7 downward on pole member 2 so that legs 3 are disposed in either a tripod arrangement as shown in FIG. 1 or a perpendicular arrangement as shown in FIG. 2. The student then deploys locking means 8 in its locked position to secure the legs in the desired working position. The student also rotates arm 24 upward from the position shown in FIG. 5 to an angled and comfortably work position as exemplified in FIGS. 1 and 2, inserts arm 24 into aperture 25 of hinge member 23 of the dental model and tightens screw 26 to secure the dental model in place. The height of the model may then be adjusted by loosening height adjustment means 9 and moving pole member 2 from the telescoped position shown in FIG. 5 to the extended position shown in FIGS. 1 and 2.

Although the invention has been disclosed with regard to certain embodiments described in detail, various equivalents, codifications and improvements will be apparent to one of ordinary skill in the arts. Such equivalents, modifications and improvements are intended to be encompassed by the following claims.

I claim:

1. A light weight, portable teaching and practicing device for the simulation and practice of dental procedures comprising:
   (i) a stand, the stand having a base and a pole member, the pole member being disposed in substantially perpendicular relation to the base and attached to the base at one of its ends;
   (ii) a dental model of the upper and lower teeth and gums of a human, the model comprising an upper teeth plate, a lower teeth plate, and a hinge member, the hinge member being formed and disposed in hinge forming relation between the upper teeth plate and the lower teeth plate to enable opening and closing of the plates in relation to each other and having an aperture disposed and arranged to accept an arm;
   (iii) fastening means for fastening the dental model to the pole member at the end opposite the base, and
   (iv) an arm disposed and arranged in connecting relation between the dental model and the pole member at the end opposite the base the arm being removably mounted at one end within the aperture of the hinge member and being hingably attached at the other end to the end of the pole member.

2. The teaching and practice device of claim 1 wherein the base comprises a plurality of foldable legs.

3. The teaching and practice device of claim 1 wherein the pole member is composed of two telescoping poles and is height adjustable.

4. The teaching and practice device of claim 1 wherein the arm is attached to the first pole member by an adjustable clamp.

5. The teaching and practice device of claim 4 wherein the clamp includes a hinge-to permit rotation of the second pole member.

\* \* \* \* \*